US012248957B2

(12) United States Patent
Chen et al.

(10) Patent No.: US 12,248,957 B2
(45) Date of Patent: Mar. 11, 2025

(54) GEOGRAPHIC DATASET PREPARATION AND ANALYTICS SYSTEMS

(71) Applicant: Google LLC, Mountain View, CA (US)

(72) Inventors: Aiyou Chen, Palo Alto, CA (US); Timothy Chun-Wai Au, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 388 days.

(21) Appl. No.: 17/899,202

(22) Filed: Aug. 30, 2022

(65) Prior Publication Data

US 2023/0036170 A1 Feb. 2, 2023

Related U.S. Application Data

(63) Continuation-in-part of application No. 16/834,843, filed on Mar. 30, 2020, now Pat. No. 11,514,274.

(51) Int. Cl.
*G06Q 30/0204* (2023.01)
*G06Q 30/0201* (2023.01)

(52) U.S. Cl.
CPC ..... *G06Q 30/0205* (2013.01); *G06Q 30/0201* (2013.01)

(58) Field of Classification Search
CPC ........... G06Q 30/0205; G06Q 30/0201; G06Q 30/0241; G06F 16/29; G06F 18/2115;
(Continued)

(56) References Cited

U.S. PATENT DOCUMENTS 11,109,194 B1 8/2021 Pinheiro et al.
2014/0280190 A1* 9/2014 Cronin ............... G06F 16/2465
707/741
(Continued)

FOREIGN PATENT DOCUMENTS

WO WO 2011/143045 11/2011
WO WO 2020/013821 1/2020

OTHER PUBLICATIONS

Chen et al., "Robust Casual Inference for Incremental Return on Ad Spending with Randomized Geo Experiments", AMT, Google, Inc., Draft, Apr. 25, 2019, 31 pages.
(Continued)

*Primary Examiner* — Md K Talukder
(74) *Attorney, Agent, or Firm* — DORITY & MANNING P.A.

(57) ABSTRACT

Techniques for preparing datasets for geo experiments and improving accuracy of geo experiments are presented herein. The system can access a dataset of a plurality of geographic pairs. Additionally, the system can calculate a first outcome estimate based on a difference in response data and a difference in input data for a first geographic pair. Moreover, the system can calculate a plurality of experimental uncertainty estimates associated with the plurality of geographic pairs during an experimental time interval. The system can access historical data associated with the plurality of geographic pairs. Furthermore, the system can determine a beta value and a trim rate that reduces a sum of the plurality estimates. Subsequently, the system can remove, based on the first outcome estimate and the beta value, the first geographic pair from the plurality of geographic pairs to generate the first subset of geographic pairs.

20 Claims, 6 Drawing Sheets

(58) Field of Classification Search
CPC .... G06F 18/214; G06F 18/22; G06F 18/2413; G06N 20/00; G06V 10/759
See application file for complete search history.

(56) References Cited

U.S. PATENT DOCUMENTS

| | | | |
|---|---|---|---|
| 2018/0046926 A1* | 2/2018 | Achin | G06F 9/5011 |
| 2019/0065638 A1* | 2/2019 | Sun | H04L 65/10 |
| 2020/0117580 A1* | 4/2020 | Lekivetz | G06F 11/368 |
| 2021/0124858 A1* | 4/2021 | Morgan | G06F 30/23 |
| 2021/0312221 A1* | 10/2021 | Chen | G06Q 30/0241 |
| 2021/0312497 A1 | 10/2021 | Chen et al. | |
| 2021/0357952 A1 | 11/2021 | Liu et al. | |
| 2023/0051833 A1* | 2/2023 | Achin | G16H 50/50 |
| 2023/0343003 A1* | 10/2023 | King | G06F 3/0481 |

OTHER PUBLICATIONS

Chen et al., "Robust Casual Inference for Incremental Return on Ad Spending with Randomized Geo Experiments", Google LLC, Nov. 26, 2019, 39 pages.
International Search Report and Written Opinion for PCT Application Serial No. PCT/US2020/051823, dated Jan. 18, 2021, 13 pages.
International Preliminary Report on Patentability for Application No. PCT/US2020/051823, mailed Oct. 13, 2022, 6 pages.

* cited by examiner

GEOGRAPHIC DATASET PREPARATION AND ANALYTICS SYSTEMS

PRIORITY CLAIM

The present application is a continuation-in-part of and claims benefit to U.S. application Ser. No. 16/834,843 having a filing date of Mar. 30, 2020. Applicant claims priority to and the benefit of such application and incorporates such application herein by reference in its entirety.

FIELD

The present disclosure relates generally to the field of geographic experiment models. More particularly, the present disclosure relates to generating datasets for geographic experiments by trimming outliers and performing geographic experiments with covariate adjustments to accurately predict the impact of content.

BACKGROUND

Performing geographic experiments can provide quantitative and qualitative data about the impact of content provider initiatives. In a computer networked environment, geographic experiments can be used to predict the impact of content. In some instances, geographic experiment models enable a content provider to determine a causal and incremental impact of content. In geographic experiments, geographic regions are divided into treatment and control groups. Geographic experiments can use geographies to define a control and a treatment group rather than users or web cookies. For example, the regions in the treatment group are exposed to an intervention while regions in the control group remain are not changed. The intervention happens for a duration of time and the response metric is observed. The geographic experiment can enable the detection of an incremental change in the response metric of the treatment regions.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for preparing datasets for geo experiments and performing more accurate geo experiments. The method can include accessing, by the one or more computing devices, a dataset of a plurality of geographic pairs. The dataset of the plurality of geographic pairs can include input data, response data, and location identifiers associated with each geographic region. The response data can be a result of an action associated with the input data. A first geographic pair of the dataset of the plurality of geographic pairs can include a first geographic region and a second geographic region. Additionally, the method can include calculating, by the one or more computing devices, a first outcome estimate based on a difference in response data and a difference in input data for the first geographic pair. Moreover, the method can include calculating, by the one or more computing devices, a plurality of experimental uncertainty estimates associated with the plurality of geographic pairs during an experimental time interval. The plurality of experimental uncertainty estimates can be calculated based on a plurality of different simulations for the plurality of geographic pairs during the experimental time interval. Furthermore, the method can include accessing, by the one or more computing devices, historical data associated with the plurality of geographic pairs. The historical data can be associated with a first time interval, the first time interval occurring prior to the experimental time interval. The historical data can include a historical response difference between the plurality of geographic pairs during the first time interval. Subsequently, the method can include determining a beta value associated with the historical response difference between the plurality of geographic pairs during the first time interval. The beta value can be determined to reduce a sum of the plurality of experimental uncertainty estimates associated with the plurality of geographic pairs. The method can also include removing, based on the first outcome estimate and the beta value, the first geographic pair from the plurality of geographic pairs to generate a first subset of geographic pairs. The method can include providing, by the one or more computing devices, the first subset of geographic pairs.

In some implementations, the method can further include receiving an input parameter associated with a geo experiment for an entity. Additionally, the method can include calculating, using the first subset of geographic pairs and the input parameter, an incremental response on incremental input estimate. Moreover, the method can include presenting, on a display of a content provider device, the incremental response on incremental input estimate. In some instances, the first geographic pair is removed from the plurality of geographic pairs further based on the input parameter. In some instances, the input parameter is the experimental time interval, and the beta value is determined based on the experimental time interval. In some instances, the input parameter is a desired change in input level, and wherein the beta value is determined based on the desired change in input level. In some instances, the input parameter is a geographic area to target, and the beta value is determined based on geographic area to target.

In some instances, the beta value is further determined based on a confidence interval of a distribution curve associated with the plurality of uncertainty estimates being below a certain threshold.

In some instances, the dataset of the plurality of geographic pairs further includes difference in response data during the experimental time interval, difference in input data during the experimental time interval, and difference in input data during the first time interval.

In some instances, the historical data including historical input data and historical response data associated with each geographic, and the historical response difference is calculated based on a difference in historical response data and a difference in historical input data.

In some implementations, the method can further include determining, by the one or more computing devices, a trim rate. A machine-learned model can optimize the trim rate to reduce a sum of the plurality of uncertainty estimates associated with the plurality of geographic pairs. Additionally, the first geographic pair can be removed, based on the trim rate, from the plurality of geographic pairs to generate the first subset of geographic pairs. In some instances, the trim rate is further determined based on a confidence interval of a distribution curve associated with the plurality of uncertainty estimates being below a certain threshold.

In some implementations, the method can further include accessing data corresponding to a plurality of geographic regions. The data can include input data, response data, and location identifiers associated with each geographic region.

Additionally, the method can further include calculating a difference in input data and a difference in response data for each geographic region of the plurality of geographic regions. Moreover, the method can further include determining the plurality of geographic pairs based on the difference in response data and the difference in input data for each geographic region of the plurality of geographic regions.

In some instances, the plurality of different simulation for the plurality of geographic pairs are generated by separating the geographic region in a geographic pair of the plurality of geographic pairs into a treatment region or a control region for a plurality of simulations, wherein each simulation in the plurality of simulations generates an outcome estimate. In some instances, the plurality of uncertainty estimates is further calculated based on the outcome estimate for each simulation in the plurality of simulations.

In some instances, the response data is a key performance indicator, and the beta value is determined based on the key performance indicator.

Another example aspect of the present disclosure is directed to a computing system having one or more processors, and one or more non-transitory computer-readable media that collectively store a machine-learned model and instructions. The machine-learned model is configured to generate a first subset of geographic pairs from a plurality of geographic pairs. The instructions, when executed by the one or more processors, cause the computing system to perform operations. The operations include accessing a dataset of a plurality of geographic pairs. The dataset of the plurality of geographic pairs can include input data, response data, and location identifiers associated with each geographic region. The response data can be a result of an action associated with the input data. A first geographic pair of the dataset of the plurality of geographic pairs can include a first geographic region and a second geographic region. Additionally, the operations can include calculating a first outcome estimate based on a difference in response data and a difference in input data for the first geographic pair. Moreover, the operations can include calculating a plurality of experimental uncertainty estimates associated with the plurality of geographic pairs during an experimental time interval. The plurality of experimental uncertainty estimates can be calculated based on a plurality of different simulations for the plurality of geographic pairs during the experimental time interval. Furthermore, the operations can include accessing historical data associated with the plurality of geographic pairs. The historical data can be associated with a first time interval, the first time interval occurring prior to the experimental time interval. The historical data can include a historical response difference between the plurality of geographic pairs during the first time interval. Subsequently, the operations can include determining a beta value associated with the historical response difference between the plurality of geographic pairs during the first time interval. The beta value can be determined to reduce the sum of the plurality of experimental uncertainty estimates associated with the plurality of geographic pairs. The operations can also include removing, based on the first outcome estimate and the beta value, the first geographic pair from the plurality of geographic pairs to generate a first subset of geographic pairs. The operations can include providing, by the one or more computing devices, the first subset of geographic pairs.

Another example aspect of the present disclosure is directed to one or more non-transitory computer-readable media that collectively store instructions that, when executed by one or more processors, cause the one or more processors to perform operations. The operations include accessing a dataset of a plurality of geographic pairs. The dataset of the plurality of geographic pairs can include input data, response data, and location identifiers associated with each geographic region. The response data can be a result of an action associated with the input data. A first geographic pair of the dataset of the plurality of geographic pairs can include a first geographic region and a second geographic region. Additionally, the operations can include calculating a first outcome estimate based on a difference in response data and a difference in input data for the first geographic pair. Moreover, the operations can include calculating a plurality of experimental uncertainty estimates associated with the plurality of geographic pairs during an experimental time interval. The plurality of experimental uncertainty estimates can be calculated based on a plurality of different simulations for the plurality of geographic pairs during the experimental time interval. Furthermore, the operations can include accessing historical data associated with the plurality of geographic pairs. The historical data can be associated with a first time interval, the first time interval occurring prior to the experimental time interval. The historical data can include a historical response difference between the plurality of geographic pairs during the first time interval. Subsequently, the operations can include determining a beta value associated with the historical response difference between the plurality of geographic pairs during the first time interval. The beta value can be determined to reduce the sum of the plurality of experimental uncertainty estimates associated with the plurality of geographic pairs. The operations can also include removing, based on the first outcome estimate and the beta value, the first geographic pair from the plurality of geographic pairs to generate a first subset of geographic pairs. The operations can include providing, by the one or more computing devices, the first subset of geographic pairs.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
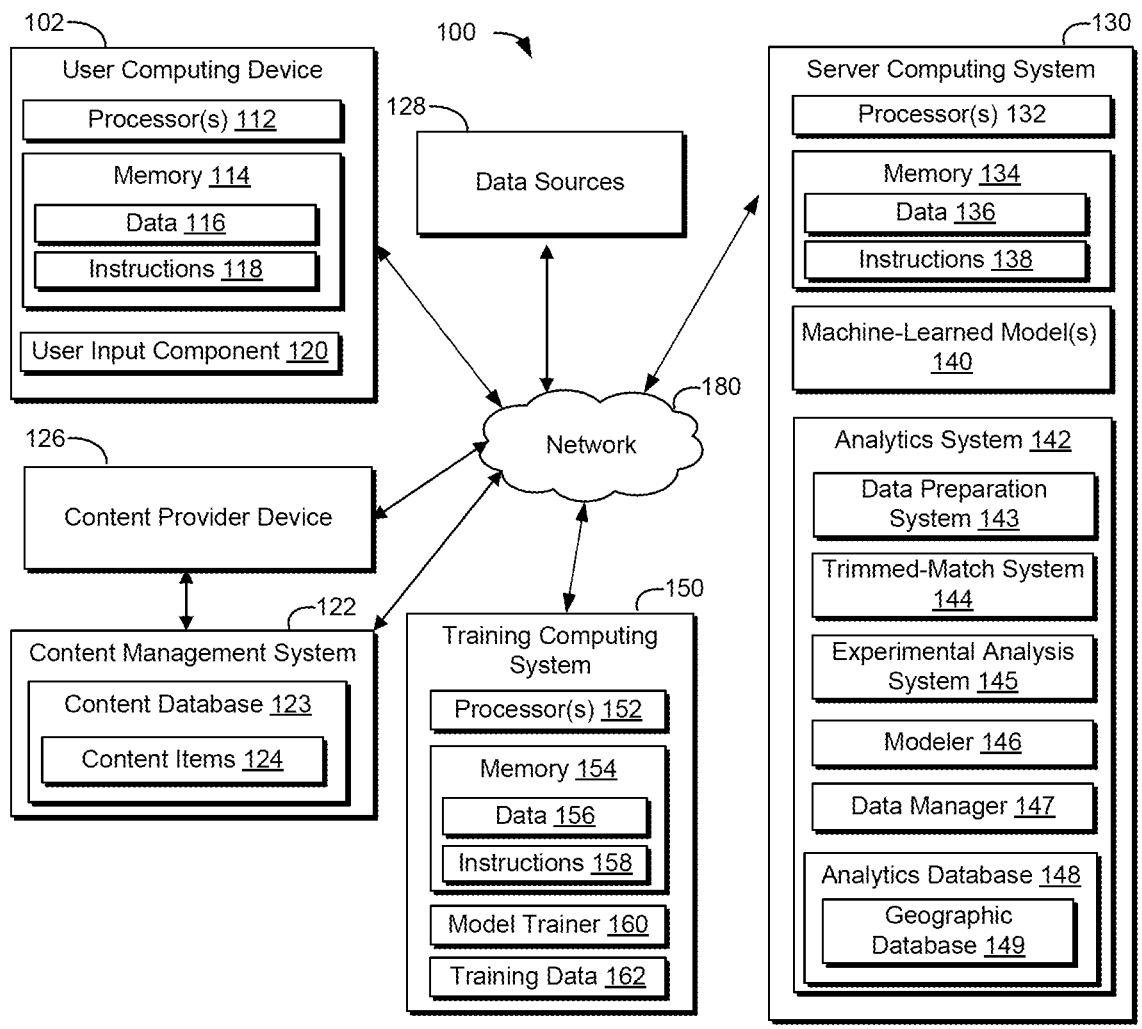
FIG. 1A depicts a block diagram of an example system according to example embodiments of the present disclosure.

Reference numerals that are repeated across plural figures are intended to identify the same features in various implementations.

DETAILED DESCRIPTION

Overview

In many systems, to measure the impact of content provider initiatives, content providers employ a geo experiment model which partitions a geographic region of interest into a set of smaller non-overlapping geos that are regarded as the units of experimentation rather than the individual users themselves. Indeed, since their introduction, geo experiments have gone on to become a standard tool for the causal measurement of content provider initiatives. However, geo experiments also introduce some additional complexity which makes geo experiment model predictions difficult (e.g., quantitative and qualitative data about the impact of content provider initiatives).

Often only a small number of heterogeneous experimental paired geos are available for experimentation, which makes it challenging to obtain reliable geo experiment model predictions with existing methods. Thus, the ability to design geographic experimental datasets for geographic experiments, such that pre-experimental data can be evaluated to select well-matched geographic pairs utilized in a subsequent geographic experiment, provides geographic experiment models with accurate data to produce accurate predictions.

Generally, the present disclosure is directed to techniques for preparing experimental datasets for geographic (geo) experiments by trimming outliers and performing geo experiments with covariate adjustments to accurately predict the impact of content. In some embodiments, geographic experiments are performed on pairs of matched geos (e.g., first geo being Los Angeles, and second geo being Chicago), such that one geo is selected to be the control region and the other geo is selected to be the treatment region. However, accurate impact data can depend on well-matched geos before geographic experiments begin. Thus, the techniques described herein enable the designing of geographic experimental datasets (e.g., geographic pairs) based on evaluating pre-experimental data to select well-matched geographic pairs utilized in a subsequent geographic experiment and also remove (e.g., trim) outlier pairs. The outlier pairs can be removed using a trimmed-match technique.

The system can utilize randomized paired geo experiments to determine the incremental response. However, in some implementations, the randomized paired geo experiments require a threshold number of geos (e.g., greater than 100 geos or 50 geo pairs) to provide accurate estimation. Unfortunately for many locations (e.g., many countries in Europe and Asia), the number of available geos is less than the threshold number of geos (e.g., 100), which may make the geo experiments not accurate for these countries. However, by using the techniques described herein, the system can provide an unbiased estimation (e.g., iROCI) and projections even for locations that have a number of available geos that is less than the threshold number of geos. Moreover, alternative methods, such as time-based regression, rely on predictive modeling, which are often less reliable than causal modeling.

According to some embodiments, the present disclosure describes techniques of using a covariate adjustment by using a beta value to discount (e.g., adjust) an imbalance. By evaluating pre-experimental data to modify the predicted impact (e.g., by determining a beta value), the techniques described herein enables a more accurate prediction (e.g., narrower range for the predicted outcome, smaller variance) of the impact of an initiative. In some instances, some geo pairs may have minor imbalance, the techniques described herein can be used to adjust the imbalance by using a beta value so that the geo pairs become better matched after the adjustment, and therefore can significantly improve the efficiency of the estimation for many case studies, in comparison to conventional methods, for the same experiments.

According to some embodiments, the system can perform the following operation for analyzing a randomized paired geo experiment. At the first phase, for each pair of geos (i.e., one treatment and the other control), the system can receive (e.g., collect, obtain) a plurality (e.g., three) on inputs (e.g., data points). In some instances, a first input can be a key performance indicator (KPI), such as the difference of sales (e.g., revenue) between the treatment geo and the control geo during a test period. The first input can be denoted as Y. The second input can be the difference of expenses (e.g., ad spend) between the treatment and the control geos during the test period. The second input can be denoted as X. The third input can be the difference of expenses (e.g., ad spend) between the treatment and the control geos before the test started. The third input can be denoted as V.

At the second phase, the system can estimate incremental response on incremental input (iROCI). The system can determine, for any real value of beta value ($\beta$), the point estimate and threshold (e.g., 50%) confidence interval of the predicted outcome (e.g., iROCI) by using a trimmed match technique, with input data (e.g., X and Y−$\beta$*V) across all pairs. The trimmed match method is further described in the Trimmed Match Technique section below. Moreover, the system, using a machined-learned model, can determine a beta value ($\beta$) that provides a minimum threshold confidence interval (e.g., width of 50% confidence interval). Subsequently, the system can present, to a content provider device, a predicted outcome (e.g., an iROCI estimate) that is a small variance based on the determined beta ($\beta$) value. By using the beta value to adjust for an imbalance, the predicted outcome can be more accurate and have smaller variance (e.g., smaller range) than conventional methods.

In some instances, the iROCI can be an Incremental Return on Ad Spend (iROAS), and the system can present the iROAS estimate to the content provider. The iROAS estimate can be the ratio of the causal effect of an initiative by a content provider on sales to its causal effect on spend. The ratio can be calculated by dividing the overall incremental sales by the overall incremental spend. For example, by using a Rubin causal model (RCM), incremental sales can be defined as the difference between the potential sales under the treatment condition and the potential sales under the control condition. Additionally, incremental spend can be defined as the difference between the potential spend under the treatment condition and the spend under the control condition. Moreover, iROAS can be defined for the target population, as well as for each geo. By using randomized experiments, incremental values can be estimated by comparing the treatment and control groups (e.g., mean of difference, difference-in-difference technique). Furthermore, the iROAS can be estimated by the ratio of the causal effect when comparing the treatment and control groups.

Additionally, response difference between the first and second geos before the start of the experimentation can be discounted by using a beta value (e.g., by using a discounting factor), from the predicted impact of the initiative. For example, the response difference between the first and second geos before the start of the experimentation can be due to other factors (e.g., population difference between the paired geos). For example, as described later in Table 2, Los Angele can be the first geo and selected to be the control region, and Chicago can be the second geo and selected as the treatment region. Because of some differences (e.g., population, other factors) between Los Angeles and Chicago, the beta value can adjust the imbalance between this geo pairs in order to improve the prediction (e.g., predicted outcome, point estimate, incremental response on incremental input) and also narrow the range of the predicted outcome.

This causal approach allows geographic experiment models to provide significant improvements to the design of geographic experiments, the accuracy of predictions, and the performance of the geographic experiment models. Techniques described herein enable content providers to make better informed decisions about their initiatives. Therefore, aspects of the present disclosure address problems in preparing geographic data by introducing a causal design approach that evaluates pre-experimental data and provides well-matched geographic pairs to geographic experiment models such that the models can improve performance and produce accurate predictions for content providers.

According to some embodiments, techniques described herein provide more accurate calculations of incremental response on incremental input (iROCI) estimates. In some instances, a system, having a machine-learned model, can determine a beta value (e.g., discounting factor) associated with a response difference of the heterogeneous paired geos. The machine-learned model can determine the beta value to optimize (e.g., reduce the variance, reduce the confidence interval) to accuracy of the prediction. As a result, using a beta value can enable more accurate predictions of an impact in response to an initiative from a content provider.

The technology described herein can provide a number of technical effects and benefits. For example, as previously indicated, the technology described herein can remove outlier geo pairs that are poorly matched. Additionally, the technology described herein can utilize a covariant adjustment to adjust geo pairs with minor imbalance to better match the geo pairs. By being a better matched geo pair, it reduces the likelihood that the geo pair is trimmed (e.g., removed). As a result, a larger fraction of the collected data can be geo pairs, because the geo pairs are better matched so fewer geo pairs are trimmed. Moreover, the techniques enable better use of the available data, which results in less unnecessary data being transmitted between the different components in the network system. This enables efficiency gains in the use of the network bandwidth. Furthermore, the techniques described herein enable increased accuracy of the modeling and data processing compared to conventional methods.

With reference now to the Figures, example embodiments of the present disclosure will be discussed in further detail.

Example Devices and Systems

In some implementations, the system can receive data corresponding to a plurality of geographic regions. The system can generate (e.g., prepare) geographic data utilizing the geographic experiment model disclosed herein. The generated geographic data can include well-matched geographic pairs such that the geographic experiment models can improve performance and produce accurate experimental results that can be utilized by content providers to make informed decisions about future initiatives based on past and current actions.

In situations in which the systems discussed here collects personal information about users and/or entities, or may make use of personal information, the users and/or entities are provided with an opportunity to control whether programs or features collect user information and/or entity information (e.g., information about a user's social network, social actions or activities, profession, a user's preferences, or a user's current location), or to control whether and/or how to receive content from the content server that may be more relevant to the user and/or entity. In addition, or in the alternative, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user and/or entity have control over how information is collected about the user and/or entity and used by a content server.

FIG. 1A depicts a block diagram of an example computing system 100 according to example embodiments of the present disclosure. The system 100 includes a user computing device 102, a server computing system 130, a training computing system 150, a content management system 122, data sources 128, and content provider devices 126 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can also include one or more user input components 120 that receives user input. For example, the user input component 120 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user computing device 102 may be used by a user to perform various actions and/or access various types of content, some of which may be provided over a network

180. The user computing device 102 may be used to send data to the server computing system 130, or may be used to access websites (e.g., using an internet browser), media files, and/or any other types of content. In some implementations, the user computing device 102 has enabled location services which can be tracked over network 180. Location services may use GPS or other technologies to determine a location of user computing device 102.

In some instances, the content provider device 126 can be a user computing device 102. Additionally, the content provider device can interact with a content management system 122 to select content for display to users.

The content management system 122 may be configured to select content for display to users within resources (e.g., webpages, applications) and to provide content items to the user computing device 102 over the network 180 for display within the resources. The content from which the content management system 122 selects items may be provided by one or more content providers via the network 180 using one or more content provider device(s) 126. In some implementations, the content management system 122 may select content items from content providers to be displayed on the user computing device 102. In such implementations, the content management system 122 may determine content to be published in one or more content interfaces of resources (e.g., webpages, applications).

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

In some implementations, the server computing system 130 can store or otherwise include one or more models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

In some implementations, the server computing system 130 can store or otherwise include an analytics system 142. For example, the analytics system 142 can include a data preparation system 143, a trimmed-match system 144, an experimental analysis system 145, a modeler 146, a data manager 147, and an analytics database 148. The analytics database 148 can include a geographic dataset 149. Example analytics system 142 are discussed with reference to FIG. 1B.

Data sources 128 may include data collected by the server computing system 130 (e.g., analytics system 142) by receiving interaction data from the content provider device 126 and/or user computing device 102. The data may be content input (e.g., content spend) and response (e.g., content revenue) for particular media channels (e.g., television, Internet content, radio, billboards, printed publications) at one or more points in time. The content input may include spending on television content, billboard content, Internet content (e.g., search content spend, or display content spend), and so on. The data may be data input for particular entities or users (e.g., patients, customer purchases, internet content items). The content input may include data associated with a plurality of entities, a plurality of users, a specific entity, a specific user, and so on. Data sources 126 may also be various data aggregating systems and/or entities that collect content data. The server computing system 130 can receive geographic sub-region data from the data sources 126 via the network 180. This information may be stored as data 136 and/or as geographic sub-region data in the geographic dataset 149 of the analytics database 148.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. In some implementations, performing backwards propagation of errors can include performing truncated backpropagation through time. The model trainer 160 can perform a number of generalization techniques (e.g., weight decays, dropouts, etc.) to improve the generalization capability of the models being trained. The machine-learned models 140 can be trained, using the model trainer 160, to determine a beta value and/or a trim rate in order to minimize the variance and/or reduce the range associated with a predicted outcome.

In particular, the model trainer 160 can train the models 140 based on a set of training data 162. The training data 162 can include, for example, data obtained from the analytics database 148 and the content database 123. The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Figure 1B:
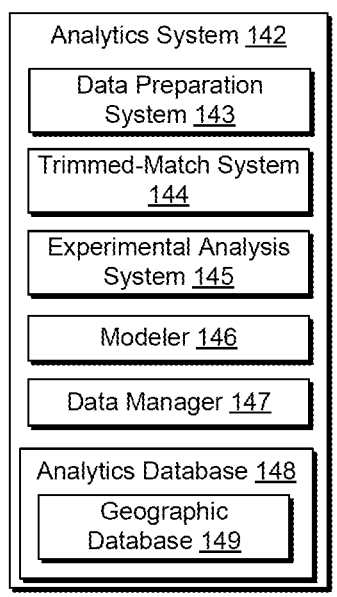
FIG. 1B depicts a block diagram of an example analytics system according to example embodiments of the present disclosure.

FIG. 1B depicts a block diagram of an example according to example embodiments of the present disclosure. The analytics system 142 can be any type of standalone computing device or can be part of the server computing system 130. The analytics system 142 can include one or more processors and a memory. The one or more processors can be any suitable processing device (e.g., a processor core, a microprocessor, an ASIC, an FPGA, a controller, a microcontroller, etc.) and can be one processor or a plurality of processors that are operatively connected. The memory can include one or more non-transitory computer-readable storage media, such as RAM, ROM, EEPROM, EPROM, flash memory devices, magnetic disks, etc., and combinations thereof. The memory can store data and instructions which are executed by the processor configured to perform various functions of the analytics system 142.

In some implementations, the analytics system 142 can include a data preparation system 143, a trimmed-match system 144, an experimental analysis system 145, a modeler 146, a data manager 147, and an analytics database 148. It should be understood that various implementations may include more, fewer, or different systems than illustrated in FIG. 1B, and all such modifications are contemplated within the scope of the present disclosure.

The analytics system 142 may be used by content providers to quantify the impact (e.g., input, response) of content items. In various implementations, the analytics system 142 and the content management system 122 in FIG. 1A can be implemented as separate systems or integrated within a single system (e.g., the content management system 122 can be configured to incorporate some or all the functions/capabilities of the analytics system 142). The analytics system 142 may be configured to communicate over network 180 via a variety of architectures (e.g., client/server, peer-to-peer). The analytics system 142 can be configured to provide a variety of interfaces for designing geographic experiments, setting up geographic experiments, monitoring progress of geographic experiments, and analyzing results of geographic experiments.

The analytics system 142 can be communicably and operatively coupled to the analytics database 148 which may be configured to store a variety of information relevant to geographic experiments (collectively referred to herein as "geo experiments") performed by a modeler 146. Additionally, information received from user computing device 102, content provider device 126, data sources 128, and/or content management system 126 can be stored in the analytics database 148. The analytics system 142 can be configured to query the analytics database 148 for information and store information in the analytics database 148.

In various implementations, the analytics database 148 includes various transitory and/or non-transitory storage mediums. The storage mediums may include but are not limited to magnetic storage, optical storage, flash storage, RAM, etc. The analytics database 148 and/or the analytics system 142 can use various APIs to perform database functions, such as managing data stored in the analytics database 148. The APIs can be but are not limited to SQL, NoSQL, NewSQL, ODBC, JDBC.

In some implementations, a content provider, via the content provider device 126, submits to the analytics system 142 a request to perform a geo experiment. The request can include one or more input parameters and/or information about the request (e.g., experiment time interval, one or more geographic locations, and an input amount, content items, campaign identification, desired change in input level, geographic areas to target) which may be stored in analytics database 148 (e.g., geographic dataset 149). In addition, analytics system 142 may be configured to retrieve data via network 180 (e.g., user activity data, content campaign data) which may be stored in the geographic dataset 149 of analytics database 148.

Analytics system 142 can be configured to communicate with any device or system shown in computing system 100 via network 180. The analytics system 142 can be configured to receive information from the network 180. The information may include browsing histories, cookie logs, television content data, printed publication content data, radio content data, and/or online content activity data. The analytics system 142 can be configured to receive and/or collect the interactions that the user computing device 102 have on the network 180. This information may be stored as geographic data in a geographic dataset 149 in the analytics database 148.

The analytics system 142 can be configured to generate (e.g., determine, fit) and send information and/or notifications relating to various metrics (e.g., predictions) or models to the content provider device 126. This may allow a user of the content provider device 126 to interact (e.g., review, respond) with the various metrics or models generated by the analytics system 142. Further, the analytics system 142 can use the various metrics to identify opportune times to send a notification to the content provider device 126 to initiate a new content provider initiative (e.g., content campaign). Further, the analytics system 142 can use the various metrics to identify appropriate amounts (e.g., an optimal mixed media input) to input on various media channels (e.g., television advertising, Internet advertising, radio advertising). The analytics system 142 can cause a message to be sent to the content management system 122 and/or the content provider device 126 indicating that the content management system 122 should contact a certain user at a certain time and/or a content campaign operates with certain parameters.

The data manager 147 can be configured to generate various data structures stored in the analytics database 148. For example, the data manager 147 can be configured to generate one or more geographic regions (geos). The geos may be a data structure included in the geographic dataset 149 and indicate various geographic areas. For example, the geographic areas could be states, cities, countries, or any other geographic area. The geos can be generated by the data manager 147 by grouping one or more smaller geographic regions together (e.g., sub-regions). For example, the geos could be generated by grouping multiple states into East coast, West coast, and Midwest. Further, multiple cities within a particular state could be grouped together to form a predefined number of the geos.

The data manager 147 can also be configured to receive a plurality of geographic subregion data for each of the sub-regions that make up the geos. For example, for a particular state, the state may have five geos that each include five different cities. The data manager 147 can be configured to receive the geographic sub-region data (e.g., stored in geographic dataset 149) for each of the cities of each of the five geos. Based on a correlation between the geographic sub-regions, the geos, and an indication of location in the received data, the geographic sub-region data can be sorted (grouped) into geo-level data by the data manager 147. In some embodiments, the data manager 147 can be configured to receive data for the geos as a whole (e.g., stored in geographic dataset 149) instead of data specific to particular sub-regions that make up the geos. The received data that the data manager 147 receives can be data that analytics system 142 aggregates and/or data that the analytics system 142 receives from the data sources 128.

The data manager 147 can also be configured to communicate with content management system 122 via network 180 in order to determine a set of one or more content items associated with a content provider to be analyzed during a geo experiment. In addition, data manager 147 may be configured to determine one or more characteristics associated with the one or more content items. Characteristics may include associated keywords used in a search query, website views, video views (e.g., via YouTube), content views, content clicks, etc. For example, data manager 147 may be configured to determine (e.g., via a campaign ID or other identifier) content items associated with a content campaign for a new restaurant. In this example, data manager 147 may also determine that the set of content items is presented based on a set of target keywords (e.g., restaurant, new restaurant, restaurant in geographic location, etc.). Data manager 147 may also be configured to initiate a change in input level associated with a set of content items for analysis during a geo experiment.

The data manager 147 can further be configured to retrieve and analyze user activity data including actions performed by user computing device 102 over network 180. In some implementations, data manager 147 retrieves user activity data and creates an activity log with one or more log entries. The activity log can span over any specified time period (e.g., past month, past week, etc.) and can be specific to users based on any constraints (e.g., users in France, users in Los Angeles, Android users in Boston). The data manager 147 may be configured to use a filtered activity log to determine a subset of users (i.e., a subset of the users associated with the original activity log). The subset of users may be users that have a likelihood of being exposed to the content items being analyzed. In addition, data manager 147 may be configured to retrieve user activity data related to a response metric being analyzed during a geo experiment.

The geographic dataset 149 may include subsets of data that each include response data, content input data (e.g., input data), a content type, control variables, evaluation data, training data, and/or a location identifier associated with each geo. The data may be for one or more points in time over an interval (e.g., data for each hour out of a day, data for each day out of a year, data for each month out of a decade). The content type may indicate a particular media channel of the set of data, for example, television, radio, Internet content, newspaper or magazine content, and so on. The response data can be a result of an action associated with the input data. That is, the response data may indicate amounts of revenue at particular times. In some embodiments, the response can be the number of conversions, number of sales, number of account registrations, and so on. The input data may indicate amounts (e.g., fiat currency) of content input for the content type at particular times. The input data may further indicate a specific number of content runs. The geographic dataset 149 may include time series data structures (also referred to herein as "time intervals") indicating amounts of input data, response data, for various media channels and/or various geographic regions over time.

The data preparation system 143 can be configured to prepare data for geo experiments based on one or more input parameters and pre-geo experiment data. In some implementations, content provider device 126 may specify one or more input parameters (e.g., experiment budget, experiment time interval, one or more geographic locations, a target incremental response on incremental input (iROCI–$\theta^*$)), a set of one or more content items (e.g., some or all items associated with a campaign) to be analyzed, as well as a desired response metric to be recorded during a geo experiment (e.g., randomized geo experiment).

In various implementations, the iROCI (e.g., $\theta^*$) used herein may refer to a value associated with the impact of a content provider initiate. For example, if $\theta^*=2$, then for every one unit of content input the content provider receives two units of content response. In another example, if $\theta^*=10$, then for every one unit of content input the content provider receives ten units of content response. Accordingly, as iROCI increases (e.g., $\theta^*$), one unit of content input can result in increased units of content response. In another example, a content provider device may specify an experiment budget of $5,000 and an experiment time interval (sometimes referred to as "experiment timeframe") of 1 month. In some implementations, the data preparation system 143 can determine an experimental time interval based on one or more input parameters. For example, the data preparation system 143 could determine an experiment time interval of 1 week based on a specified experiment budget. In another example, the data preparation system 143 could determine an experiment time interval of one day based on an event happening in one or more geographic locations (e.g., The Super Bowl, Boston Marathon, etc.).

In various implementations, the data preparation system 143 can be configured to extract training data and evaluation data from the geographic dataset 149 for one or more experiments. Both the evaluation data and training data can include response data and input data based on a time interval. In some implementations, the training data may include input data and response data based on a first time interval (e.g., 10 years, 2 years, 365 days, 1 month, 1 week, 60 minutes, 60 seconds). In various arrangements, the first time interval may be based on aggregating historical input data and response data at the geographic level. In some implementations, the first time interval may be based on a factor associated with an experimental time interval. For example, if the experimental time interval is one month, the first time interval may be ten months (i.e., ten factors larger). In various implementations, the first time interval may be based on an input parameter or available data. For example, the content provider may designate a first time interval. Additionally, the training computing system 150 (depicted in FIG. 1A) may store a time interval (e.g., one year) of training data 162.

In various arrangements, the data preparation system 143 can store the extracted training data and evaluation data for a specific geo experiment in the geographic dataset 149. Additionally, the training computing system 150 can store the extracted training data and evaluation data for a specific geo experiment as training data 162. That is, each specific geo experiment can include pre-geo experiment data (e.g., training data, evaluation data) and may be located in the analytics database 148. In various implementations, each specific geo experiment may have a unique identifier such that a specific geo experiment can be queried based on the unique identifier.

The modeler 146 may be configured to design geographic experiments based on prepared pre-geo experiment data (e.g., evaluation data, training data, and location identifiers stored in analytics database 148) and the one or more input parameters for a specific geo experiment. In various implementations, the activities of multiple systems may be combined as a single system and implemented in a single arrangement (e.g., single processing circuit described in detail with reference to FIG. 5). For example, data preparation system 143 and the modeler 146 can be combined as a single system and implemented in a single arrangement.

In some implementations, the modeler 146 can designate geographic regions as pairs (collectively referred to herein as "geo pairs") based on extracting and/or retrieving the training data of the specific geo experiment. A geographic region of interest (e.g., the United States) can be partitioned into a set of smaller geographic areas, or "geos". These geos can provide comparable sets of users for experimentation during a geo experiment. Details of how geos are chosen are beyond the scope of this disclosure, however geos generally are large enough (e.g., at least larger than a postal code) to ensure content serving accuracy and the ability to monitor the desired response metric at the geo level. In the United States, for example, one possible set of geos is the 210 designated marketing areas (DMAs) as defined by Nielsen Media Research. After a set of two or more geos for the geo experiment are identified, modeler 146 can determine geo pairs. That is, geos are paired up so that two geos in the same pair are more comparable than across pairs based on the training data (e.g., pre-geo experiment response data and pre-geo experiment input data).

For example, the table below describes a plurality of geos associated with a number of interactions included in the training data 162 for a first time interval (sometimes referred to as "timeframe"). In one example, the modeler 146 can pair the geos based on the difference in interactions (e.g., response data) for the first time interval (e.g., one year, one month, one day, every Sunday in a year, etc.).

TABLE 1

| | Before pairing: | |
|---|---|---|
| | geo | Interactions (million) |
| 1 | Los Angeles | 25M |
| 2 | Chicago | 15M |
| 3 | Miami | 11M |
| 4 | Washington | 8M |
| 5 | Milwaukee | 4M |
| 6 | Austin | 2M |
| 7 | Seattle | 7M |
| 8 | Kansas City | 9M |
| 9 | Philadelphia | 14M |
| 10 | Boston | 12M |

TABLE 2

| | After pairing: | | |
|---|---|---|---|
| pair | geo.1 | Difference (million) | geo.2 |
| 1 | Los Angeles | 10M | Chicago |
| 2 | Miami | 3M | Washington |
| 3 | Milwaukee | 2M | Austin |
| 4 | Seattle | 2M | Kansas City |
| 5 | Philadelphia | 2M | Boston |

As shown above, one example of how modeler 146 may determine geo pairs based on a set of geos and each geos training data from the time interval. Further, with n geo pairs, there are 2n possible geo pair assignments. Due to randomization, on average, the geo pairs can have similar overall response data (e.g., interactions), but they may differ for each particular geo pair assignment. However, if each pair is well-matched (e.g., similar overall response data) or if the number of pairs n is large (e.g., 1,000 geo pairs, 10,000 geo pairs), the difference for a random geo pair assignment is close to zero with high probability.

Trimmed-Match System

In some implementations, the trimmed-match system 144 can perform a plurality of simulations (e.g., geo experiment simulations) to determine a plurality of outcome estimates. The plurality of simulations can be associated with a simulation subset, where each simulation subset can be associated with a particular subset of geographic pairs. That is, each particular subset of geographic pairs may include a simulation subset that includes a plurality of simulations. For example, one particular subset of geographic pairs could include geo pair 1, geo pair 2, and geo pair 3, another particular subset of geographic pairs could include geo pair 1, geo pair 2, geo pair 3, and geo pair 4, and yet another particular subset of geographic pairs could include geo pair 1, geo pair 2, geo pair 3, geo pair 4, and geo pair 5. In this example, the trimmed-match system 144 can perform a plurality of simulation on each particular subset of geographic pairs.

Each simulation can generate a random assignment of treatment geos and control geos with each geo pair. That is, within each pair, the modeler 146 may randomly assign one of the pairs to treatment and the other to control for a particular simulation. During each simulation, a change in input level may only be observed for geos in the treatment group, whereas geos in the control group may remain unchanged. The designation of geos into control or treatment groups can be implemented in a variety of ways, including randomization (as described above) or designation by a content provider.

In some implementations, once the geos are paired based on the training data, the modeler 146 can be configured to analyze the treatment group of the evaluation data and the one or more input parameters to determine an incremental input and incremental response for the second time interval. The incremental input used herein may refer to the additional input of a content provider to receive one additional response. The incremental response used herein may refer to the additional response to the content provider as result of action associated with incremental input. That is, the evaluation data can include previous geo-experiment data associated with input data and response data for each geo g, such that the analytics system 142 can calculate the incremental input and incremental response of the treatment group of the evaluation data. In various implementations, the content provider can provide a target incremental response on content input (iROCI). The target iROCI can be determined by the machine-learned models 140 based on historical data (e.g., response data, input data, geo experiments), a beta value, a trim rate value, data from other sources (e.g., data sources 128 in FIG. 1, content database 172 in FIG. 1), randomization, designation by the content provider (i.e., input parameters), a mathematical formula, and/or a machine learning algorithm.

Prior to a geo experiment and for each simulation, modeler 146 can designate G to be the set of geos for a target population. Given a geo $g \in G$, let $(S_g, R_g) \in \mathbb{R}^2$ denote its observed bivariate outcome, where $S_g$ is content input and $R_g$ is the response variable. Geo g can denote potential outcome under the control and treatment content serving conditions as $(S_g^{(C)}, R_g^{(C)})$ and $(S_g^{(T)}, R_g^{(T)})$ respectively, where the modeler 146 can observe one of these two bivariate potential outcomes for each geo g. For each geo g, there can be two unit-level causal effects caused by the new content strategy: incremental content input and incremental response of the evaluation data, which can be defined by $S_g^{(T)} - S_g^{(C)}$ and $R_g^{(T)} - R_g^{(C)}$ respectively. The incremental response on content input (iROCI) with respect to geo g, denoted as $\theta_g$, can be the ratio of incremental response to incremental content input, as shown in Equation 1:

$$\theta_g = \frac{R_g^{(T)} - R_g^{(C)}}{S_g^{(T)} - S_g^{(C)}} \quad \text{(Equation 1)}$$

and the iROCI with respect to the population G can be defined similarly, as shown in Equation 2

$$\theta^* = \frac{\frac{1}{|G|} \sum_{g \in G} R_g^{(T)} - R_g^{(C)}}{\frac{1}{|G|} \sum_{g \in G} S_g^{(T)} - S_g^{(C)}} \quad \text{(Equation 2)}$$

Content providers may find $\theta^*$ to be a more informative pre-experiment prediction that can provide a target content performance, which is the parameter used hereafter.

In general, geo experiments often introduce some additional complexity which makes the pre-experiment prediction of the iROCI (i.e., estimated content performance) more difficult. In particular, the no interference component of the stable unit treatment value assumption. That is, the presumption that the treatment applied to one experimental unit does not affect the outcome of another experimental unit can be particularly challenging to satisfy since it may require the geos to be defined such that spillover effects (e.g., from consumers traveling across geo boundaries) can be negligible. Thus, minimizing spillover effects can often result in only a small number of highly heterogeneous geos being available for experimentation, and therefore the distributions of $\{S_g: g \in G\}$ and $\{R_g: g \in G\}$ can be very heavy tailed. For example, a heavy-tailed distribution may include a distribution that analyzes how many cups of coffee does each person drink per week. In this example, 80% of the distribution may be people that drink three cups of coffee per week, whereas 1% of the distribution may be people that drink twenty cups of coffee per week. As shown in this example, the distribution may be heavy tailed towards the 1% of coffee drinkers than drink twenty cups of coffee per week.

Equation 3 can be obtained by rearranging Equation 1, as shown below.

$$R_g^{(C)} - \theta_g S_g^{(C)} = R_g^{(T)} - \theta_g S_g^{(T)} \quad \text{(Equation 3)}$$

Based on this analysis, modeler 146 can generate predictions (sometimes referred to as estimated iROCI's) to solve for the value of $\theta^*$, which can provide a pre-experiment estimated content performance.

The following table describes the notation as it shall be used hereafter. The notation is denoted as follows:

$R_{ic}, S_{ic}$: Response and content input for control geo
$R_{it}, S_{it}$: Response and content input for treatment geo
$Y_i = R_{it} - R_{ic}$: Difference in the responses
$X_i = S_{it} - S_{ic}$: Difference in content input
$\epsilon_i(\theta) = Y_i - X_i \theta$: Difference in response background noise with respect to $\theta$ Utilizing prepared pre-geo experiment data, the distribution of $\epsilon_i(\theta^*)$ can be symmetric about an outcome estimate prespecified value (e.g., zero) for i=1, . . . n. Therefore, the expected value of $\epsilon_i(\theta^*)$ can be zero. To calculate the estimated iROCI, it is the goal of the modeler 146 to accurately predict the value of $\theta^*$ (i.e., target iROCI) based on $\epsilon_i(\theta^*)$. However, an accurate prediction may be flawed when geo pairs are poorly matched. That is, it can be difficult to know whether or how much the two geo pairs are comparable during the geographic pairing process, because for example, geos are all different from each other, and some can be much larger than others (i.e., geo heterogeneity), and/or the responses between two geos (or two groups) may be quite comparable utilizing the training data for geo pairing, but may become quite different during a geo experiment even if there is no experiment intervention (i.e., temporal dynamics). For example, these can be caused by factors such as the time interval difference between the training data (e.g., one year) and the experimental time interval (e.g., one month) or other marketing factors which cannot be controlled.

Accordingly, the trimmed-match system 144 can be configured to trim poorly matched geo pairs (e.g., heterogeneous pairs) based on a machined-learned model 140 (e.g., trimming model) before a geo experiment has been run for a plurality of simulations. In other words, the trimmed-match system 144 can be configured to select a subset of geographic pairs of a plurality of different subsets of geographic by calculating a plurality of uncertainty estimates based each simulation subset that includes a plurality of simulated outcome estimates and the target iROCI.

In some implementations, the trimmed-match system 144 retrieves geo pair data (e.g., treatment group of the evaluation data) from the geographic dataset 149 related to the geo pairs analyzed during a previous geo experiment for a specific time interval (e.g., second time interval of the evaluation data). In general, even with a careful randomized matched-pairs design (e.g., how the geo pairs are matched), where the two geos within each pair are well-matched based on pre-geo experiment data based on two sets of data (i.e., evaluation data and training data). The trimmed-match system 144 can utilize a trimming model to remove (e.g., trim) poorly-match geo pairs based on an outcome estimate (e.g., difference in input and difference in response data between the treatment geo and control geo of each geographic pair) to provide a trimmed dataset (e.g., selected subset of geographic pairs) to the modeler 146. That is, by removing certain geos that may disproportionally affect the results of a causal geo experiment, a trimming model can be utilized to provide improved geo pair matches (e.g., trimmed dataset) for experimentation.

The trimmed-match system 144 can utilize a trimming model to utilize the following derivation of the trimming model assuming that $\epsilon_1(\theta) \leq \epsilon_2(\theta) \leq \epsilon_3(\theta) \leq \ldots \leq \epsilon_n(\theta)$ to be the corresponding order statistics. This trimming model can utilize a variable value, $\lambda$, to be a variable trim rate, where $0 \leq \lambda < \frac{1}{2}$. The machined-learned models 140, using techniques described herein, can determine the optimal trim rate in order to reduce the variance and/or confidence interval. A trimmed mean statistic can be defined as the following equation:

$$\bar{\epsilon}_{n\lambda}(\theta) \equiv \frac{1}{n-2m} \sum_{i=m+1}^{n-m} \epsilon_i(\theta) \qquad \text{(Equation 4)}$$

where m is the minimal integer greater or equal to $\lceil n\lambda \rceil$. It should be noted that $\lambda$, must satisfy $n-2m \geq 1$, otherwise all members of the set of geos would be trimmed away. Following the derivations above, the trimmed mean statistic can have an expected value of zero. Therefore, the trimmed-match system 144 can determine one or more roots (e.g., outcome estimates), given a variable value $\lambda$, that can satisfy the trimmed match equation below:

$$\bar{\epsilon}_{n\lambda}(\theta^*) = 0 \qquad \text{(Equation 5)}$$

When multiple roots exist, the trimmed-match system 144 can utilize a trimming model to choose the root which minimizes a statistic (e.g., symmetric deviation), in part using the equation below:

$$D_{n\lambda}(\theta) \equiv \frac{1}{n-2m} \sum_{i=m+1}^{n-m} |\epsilon_i(\theta) + \epsilon_{n-i+1}(\theta)| \qquad \text{(Equation 6)}$$

which can measure the symmetric deviation from zero. A trimmed match estimator (e.g., estimated iROCI) can be formally defined as:

$$\hat{\theta}_\lambda^{(trim)} = \operatorname{argmin}\{D_{n\lambda}(\theta) : \bar{\epsilon}_{n\lambda}(\theta) = 0\} \qquad \text{(Equation 7)}$$

Thus, when two geos in the ith pair are "perfectly" matched, trimmed-match system 144 can expect $\epsilon_1(\theta^*)=0$. That is, if $\lambda=0$, then no trimming takes place and $\hat{\theta}_\lambda^{(trim)}$. It can also be understood that the trimmed match estimator can directly estimate $\theta^*$ (estimated iROCI) without determining either the incremental response or the incremental input. Further, the trimmed match estimator can be utilized after trimming the geo pairs that are poorly matched in terms of the $\epsilon_i(\hat{\theta}_\lambda^{(trim)})$ values.

Therefore, $\hat{\theta}_\lambda^{(trim)}$ trims the poorly matched pairs in the sense of $\epsilon_i(\theta^*)$ and estimates iROCI based on the untrimmed pairs for each simulation. That is, for each simulation k an estimated iROCI ($\hat{\theta}^{(k)}$) can be found. In some instances, Algorithm 1 can be utilized by the machine-learned model 140 and/or analytics system 142 to solve for the trimmed match prediction:

---

(Algorithm 1)

Input $\{(x_i, y_i): 1 \leq i \leq n\}$ and trim rate $\lambda > 0$; Output: roots of Equation 5.
(i) Reorder the pairs $\{(x_i, y_i): 1 \leq i \leq n\}$ such that $x_i < \ldots < x_n$; Calculate $\{\theta_{ij}: 1 \leq i < j \leq n\}$ and order them such that $\theta_{i_1 j_1} < \theta_{i_2 j_2} < \ldots \theta_{i_N j_N}$.
(ii) Start with $\theta = -\infty$ and initialize the set of untrimmed indices with:
$$I \leftarrow \{i : \lceil n\lambda \rceil < i \leq n - \lceil n\lambda \rceil\}$$
Calculate:

$$a \leftarrow \sum_{i \in I} y_i \text{ and } b \leftarrow \sum_{i \in I} x_i$$

Initialize two ordered sets $\theta_1 = \{\}$ and $\theta_2 = \{\}$
(iii) For $k = 1, \ldots, N$:
(a) If $i_k \in I$ and $j_k \notin I$, then update,
$I \leftarrow I + \{j_k\} - \{i_k\}$,
$a \leftarrow a + y_{j_k} - y_{i_k}$
$b \leftarrow b + x_{j_k} - x_{i_k}$
and append a/b to $\theta_1$ and $\theta_{i_k j_k}$ to $\theta_2$, i.e., $$\theta_1 \leftarrow \theta_1 + \left\{\frac{a}{b}\right\}$$

$\theta_2 \leftarrow \theta_2 + \{\theta_{i_k j_k}\}$
(b) If $i_k \notin I$ and $j_k \in I$, then update,
$I \leftarrow I + \{i_k\} - \{j_k\}$
and repeat the similar procedure as in (a).
(c) Otherwise, continue.
(iv) Output a subset of $\theta_1$:
(a) Append $\infty$ to $\theta_2$;
(b) For $k = 1, \ldots, |\theta_1|$,
(i) Output $\theta_1[k]$ if $f \theta_2[k] \leq \theta_1[k] \leq \theta_2[k+1]$

---

For ease of technical derivation, it can be considered the situation where the n pairs of geos are an independent and identically distributed random sample drawn from an infinite population consisting of highly heterogeneous pairs of geos.

For example, let $\{(x_i, y_i): 1 \leq i \leq n\}$ be a set of independent and identically distributed random variables based on some population distribution P. In some instances, the distribution of $\epsilon_i(\theta^*)(1 \leq i \leq n)$ can be symmetric about zero.

The trimmed-match system 144 utilizing the trimming model can correctly solve the trimmed match equation (i.e., Equation 5) above based on Algorithm 1, utilizing a variable trim rate to determine which pairs of geos in the randomized geo experiment to exclude based on how well they match. The geo pairs that are matched the most poorly are trimmed from the set, while maintaining the pairs that are matched very well (e.g., trimmed dataset) for experimentation. Algorithm 1 looks at all candidate values of θ as it grows from −∞ to ∞, and identifies the set of thresholds where the ordering of εi(θ) changes whenever θ passes those thresholds.

In order for the Algorithm 1 to work properly, the server computing system selects an optimal trim rate using the machine-learned models 140. The trimmed-match system 144 can utilize a trimming model to determine a trim rate for trimmed match equation as follows:

$$\hat{\lambda} = \operatorname{argmin}(\bar{\sigma}_\lambda^2)  \qquad \text{(Equation 8)}$$

And by minimizing the asymptotic variance (e.g., a type of standard error) of $\hat{\theta}_{80}^{(trim)}$. The equation for an estimate of asymptotic variance can be found in the equation below:

$$\bar{\sigma}_\lambda^2 = \frac{\hat{E}(\epsilon^2 \wedge q^2)}{\left[\hat{E}(X \cdot I(|\epsilon| \leq q))\right]^2} \qquad \text{(Equation 9)}$$

In Equation 9, the value of $\hat{E}(\epsilon^2 \wedge q^2)$ is defined as:

$$\hat{E}(\epsilon^2 \wedge q^2) \equiv \frac{1}{n}\left(m(\hat{\epsilon}_{m+1}^2 + \hat{\epsilon}_{m+1}^2) + \sum_{i=m+1}^{n-m} \hat{\epsilon}_i^2\right) \qquad \text{(Equation 10)}$$

Additionally, $\hat{E}(X \cdot I(|\epsilon| \leq q))$ is defined as:

$$\hat{E}(X \cdot I(|\epsilon| \leq q)) = \frac{1}{n}\sum_{i=1}^{n} X \cdot 1(\hat{\epsilon}_{m+1} \leq \hat{\epsilon}_i \leq \hat{\epsilon}_{n-m}) \qquad \text{(Equation 11)}$$

where $\hat{\epsilon} = Y_i - \hat{\eta}_\lambda^{trim} X_i$. In some instances, the value for the trim rate can be determined by minimizing Equation 9 with respect to λ. Alternatively, a proper trim rate may be chosen based on various alternatives (e.g., different types of standard errors) to asymptotic variance. In some implementations, various alternatives include heuristic choice (e.g., availability, absurdity, common, consistency, contagion, working backward, scarcity, familiarity) based on a historical data (e.g., stored in geographic dataset 149, training data 162), various approximation by sampling (e.g., bootstrap techniques, cross-validation techniques, statistical test, combined F-test), width of confidence interval (with reference to equation 12 below), and any other any alternatives known to a person of ordinary skill in the art.

Determining a Beta Value and a Trim Rate to Minimize the Confidence Interval According to some embodiments, the server computing system can determine a beta value and a trim rate to minimize the confidence interval. That is, the performance of a confidence interval can be measured by its power and empirical coverage, where the power can be defined to be the percent of replicates with lower confidence interval bounds greater than 0, and the empirical coverage is the percent of replicates with confidence intervals containing θ*.

The confidence interval (e.g., trimmed match confidence interval) can be constructed based on the minimal interval that contains all θ satisfying $|T_{n\lambda}(\theta)| \leq c$, where the threshold c can be determined based on $P(\leq c) = 1-\alpha$. That is, to determine the confidence interval the trimmed-match system 144 can let $T_{n\lambda}(\theta)$ be the studentized trimmed mean statistic with respect to $\{\epsilon_{n\lambda}(\theta): 1 \leq i \leq n\}$, defined as follows:

$$T_{n\lambda}(\theta) = \frac{\bar{\epsilon}_{n\lambda}(\theta)}{\left(\frac{\hat{\sigma}_{n\lambda}(\theta)}{\sqrt{n-2m-1}}\right)} \qquad \text{(Equation 12)}$$

where Equation 13 is the winsorized variance estimate for $\underline{\epsilon}_{n\lambda}(\theta)$:

$$\hat{\sigma}_{n\lambda}^2(\theta) = \frac{m[\epsilon_{(m+1)}(\theta)]^2 + \sum_{i=m+1}^{n-m}[\epsilon_{(i)}(\theta)]^2 + m[\epsilon_{(n-m)}(\theta)]^2 - n[\bar{\omega}_{n\lambda}(\theta)]^2}{n}$$

Additionally, Equation 14 is the winsorized mean of $\epsilon_{(i)}(\theta)$s.

$$\bar{\omega}_{n\lambda} = \frac{m \cdot \epsilon_{(m+1)}(\theta) + \sum_{i=m+1}^{n-m} \epsilon_{(i)}(\theta) + m \cdot \epsilon_{(n-m)}(\theta)}{n} \qquad \text{(Equation 14)}$$

When the distribution of $\{\epsilon_{(i)}(\theta^*): i=1, 2, \ldots, n\}$ is not too heavy tailed, the studentized trimmed mean statistic $T_{n\lambda}(\theta)$ is approximately t-distributed with n−2m−1 degrees of freedom. Therefore, in this case, a confidence interval for θ* can be constructed by choosing the critical value $$c = t_{1-\frac{\alpha}{2}, n-2m-1},$$

where $$t_{1-\frac{\alpha}{2}, n-2m-1}$$

is the $$1 - \frac{\alpha}{2}$$

quantile of t-distribution with (n−2m−1) degrees of freedom. Thus, it is adopted herein that the distribution of $\epsilon_{(i)}(\theta^*)$ is symmetric about zero for i=1, ..., n.

Accordingly, the trimmed-match system 144 can utilize the trimming model to remove geo pairs from the dataset of geo pairs based on the trim rate, for a particular simulation subset associated with a plurality of simulation associated with a particular treatment group and a particular control group. For example, when the trim rate is equal to zero, no geo pairs are removed. In another example, if the trim rate is equal to 1, two sets of geo pairs are removed based on the symmetric deviation from zero. That is, the largest symmetric deviation geo pair and smallest symmetric deviation geo pair are removed from the dataset of geo pairs. In yet another example, if the trim rate is equal to 2, four sets of geo pairs are removed based on the symmetric deviation from zero. That is, the two largest symmetric deviation geo pairs and two smallest symmetric deviation geo pairs are removed from the dataset of geo pairs. In some implementations, the dataset of geo pairs that have been trimmed can be referred to as a trimmed dataset of geo pairs and/or selected subset of geographic pairs. In some implementations, the trimmed-match system 144 can be configured to provide the plurality of outcome estimates (i.e., estimated iROCI's) for a plurality of simulations for a plurality of different subsets of geographic pairs to the modeler 146. In various implementations, the trimmed-match system 144 can store the outcome estimates in the geographic dataset 149 (e.g., ordered by content provider, grouped by characteristics).

In some implementations, once plurality of simulations for a plurality of different simulation subsets are performed that generate outcome estimates (estimated iROCI) and given a target iROCI, the modeler 146 can be configured to determine a plurality of uncertainty estimates for each of a plurality of different subsets of geographic pairs. An uncertainty estimate can be measured by the root mean square errors equation, as follows:

$$\text{RMSE}(\hat{\theta}) = \sqrt{\frac{1}{K}\sum_{k=1}^{K}(\hat{\theta}^{(k)} - \theta^*)^2} \quad \text{(Equation 15)}$$

where $\hat{\theta}^{(k)}$ is the estimated value (sometimes referred to as the "simulated value") of $\theta^*$ from the kth simulation (i.e., simulated value based on the prepared pre-geo experiment data, in particular, the treatment group of the evaluation data). With reference to Table 2 above, an uncertainty estimate could be calculated when with a subset of geographic pairs that includes all the geo pairs, is shown below $$\left(\text{i.e., trim rate} = \frac{0}{5} = 0\right)$$

TABLE 3

| SI | Treatment group | Control group | $\hat{\theta}^{(k)}$ | $\theta^*$ | $(\hat{\theta}^{(k)} - \theta^*)^2$ |
|---|---|---|---|---|---|
| 1 | Miami, Chicago, Austin, Seattle, Boston | Washington, Philadelphia, Milwaukee, Kansas City, Los Angeles | 4.59 | 5 | 0.1681 |
| 2 | Washington, Chicago, Austin, Seattle, Boston | Milwaukee, Philadelphia, Miami, Kansas City, Los Angeles | 7.83 | 5 | 8.0089 |
| 3 | Washington, Philadelphia, Milwaukee, Kansas City, Los Angeles | Miami, Chicago, Austin, Seattle, Boston | 5.46 | 5 | 0.2916 |
| 4 | Miami, Philadelphia, Milwaukee, Kansas City, Los Angeles | Washington, Chicago, Austin, Seattle, Boston | 2.13 | 5 | 8.2369 |

Furthermore, the RMSE($\hat{\theta}$) could be calculated by:

Uncertainty Estimate =

$$\text{RMSE}(\hat{\theta}) = \sqrt{\frac{1}{4}\sum_{k=1}^{4}(\hat{\theta}^{(k)} - \theta^*)^2} = \sqrt{\frac{1}{4}*16.7055} = 2.0436$$

With reference to Table 2, an uncertainty estimate with a subset of geographic pairs that includes geo pairs 1, 3, and 5 is shown below $$\left(\text{i.e., trim rate} = \frac{1}{5} = 0.2\right)$$

TABLE 4

| SIM | Treatment group | Control group | $\hat{\theta}^{(k)}$ | $\theta^*$ | $(\hat{\theta}^{(k)} - \theta^*)^2$ |
|---|---|---|---|---|---|
| 1 | Chicago, Austin, Boston | Philadelphia, Milwaukee, Los Angeles | 4.59 | 5 | 0.1681 |
| 2 | Los Angeles, Austin, Boston | Milwaukee, Philadelphia, Chicago | 4.41 | 5 | 0.3481 |
| 3 | Boston, Milwaukee, Los Angeles | Chicago, Austin, Philadelphia | 5.20 | 5 | 0.0400 |
| 4 | Philadelphia, Milwaukee, Los Angeles | Chicago, Austin, Boston | 5.62 | 5 | 0.3844 |

Furthermore, the RMSE($\hat{\theta}$) could be calculated by:

Uncertainty Estimate =

$$\text{RMSE}(\hat{\theta}) = \sqrt{\frac{1}{4}\sum_{k=1}^{4}(\hat{\theta}^{(k)} - \theta^*)^2} = \sqrt{\frac{1}{4}*0.9406} = 0.4849$$

Accordingly, the modeler 146 can be configured to select a subset of geographic pairs of a plurality of different subsets of geographic pairs based on an uncertainty estimate of a plurality of uncertainty estimates. In some implementations, the modeler 146 can retrieve prepared pre-geo experiment data from the geographic dataset 149 related to the well-matched geographic pairs based on two sets of data (i.e., evaluation data and training data) prepared by the data preparation system 143. The modeler 146 can utilize the RMSE equation (Equation 15) to remove (or trim) poorly-match geo pairs based on a plurality of simulation subsets to provide a trimmed dataset (e.g., selected subset of geographic pairs) to the experimental analysis system 145 for experimentation and analysis. That is, by removing certain geos that may disproportionally affect the results of a causal geo experiment, a geo experiment design can be utilized to provide improved geo pair matches for experimentation to the experimental analysis system 145. Thus, after evaluating the uncertainty estimates, the modeler 146 may select the subset of geographic pairs that includes geo pairs 1, 3, and 5 for experimentation (Table 5):

| pair | geo.1 | geo.2 |
|---|---|---|
| 1 | Los Angeles | Chicago |
| 3 | Milwaukee | Austin |
| 5 | Philadelphia | Boston |

As shown above, one example of how modeler 146 may select a subset of geographic pairs based on selecting the minimized (or smallest/closest to zero) uncertainty estimate of Equation 15. That is, additional details associated with the uncertainty estimates of modeler 146 are described in detail with reference to FIGS. 1A-B.

The experimental analysis system 145 can be configured to perform geo experiments and analyze results (e.g., response metrics of geo pairs) of geo experiments to calculate predictions (e.g., post-experiment outcome estimates).

In some implementations, experimental analysis system 145 can retrieve data via network 180 related to one or more response metrics being analyzed during the experiment. For example, if the response metric being measured is physical entity response, experimental analysis system 145 can be configured to retrieve entity response data over network 180. A variety of response metrics can be tracked during a geo experiment. In some implementations, the response metric is an offline response metric such as physical entity responses. Entity responses may be determined using location information (e.g., location identifier) from one or more user computing device 102. In some implementations, the response metric may include user interactions in a mapping interface, which may be indicative of an intention to visit a physical location or entity. User interactions with the mapping interface may include, for example, searching for entity locations within the control group or treatment group, requesting directions to a location of an entity within the control group or the treatment group, and/or navigating to a location of an entity within the control group or the treatment group. Online response metrics such as response data (e.g., conversion data) or any other user-specific action that can be measured and defined as a response event (e.g., online response, provision of requested data via an online form, etc.) can also be used. The experimental analysis system 145 can retrieve data from content management system 122, user computing device 102 (e.g., through the use of cookies or other identifiers), content provider devices 126, and/or data sources 128, for example. In some implementations, experimental analysis system 145 can store geo experiments results in the geographic dataset 149.

The experimental analysis system 145 can be configured to analyze the geo experimental data to determine content effectiveness. In one example, the experimental analysis system 145 can provide a prediction, post geo-experiment, for the value of θ* as discussed above. That is, the experimental analysis system 145 can be configured to analyze experimental datasets (e.g., post-geo experiment data) and provide predictions to content providers associated with content effectiveness (e.g., content input and response, iROCI). In some implementations, the iROCI predictions can be content provider specific such that the content provider can utilize the information to determine future content input for particular geographic areas and potential response from the content input. In various implementations, the iROCI predictions may be associated with a plurality of content providers.

In some implementations, analyzing may include using a machine-learned model 140 (e.g., a neural network, convolutional neural network, recurrent neural network, linear regression model, and sparse vector machine). The experimental analysis system 145 can input one or more datasets into the machine learning model 140 and receive an output from the model providing predictions to content providers associated with content effectiveness (e.g., content input and response, iROCI).

The experimental analysis system 145 can also be configured to determine one or more characteristics (e.g., search queries, industry, vertical, subject matter) associated with a set of content items. The characteristic may be used to filter an activity log including a list of each user computing device (e.g., user computing devices 102) actions in order to determine a subset of users that have a likelihood of being exposed to the content items. Each user of the subset of users may belong to one of the geos being analyzed during the geo experiment (e.g., may be physically present within the geo, may have a place of residence or work inside the geo, etc.).

FIG. 1B illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Example Methods

Figure 2:
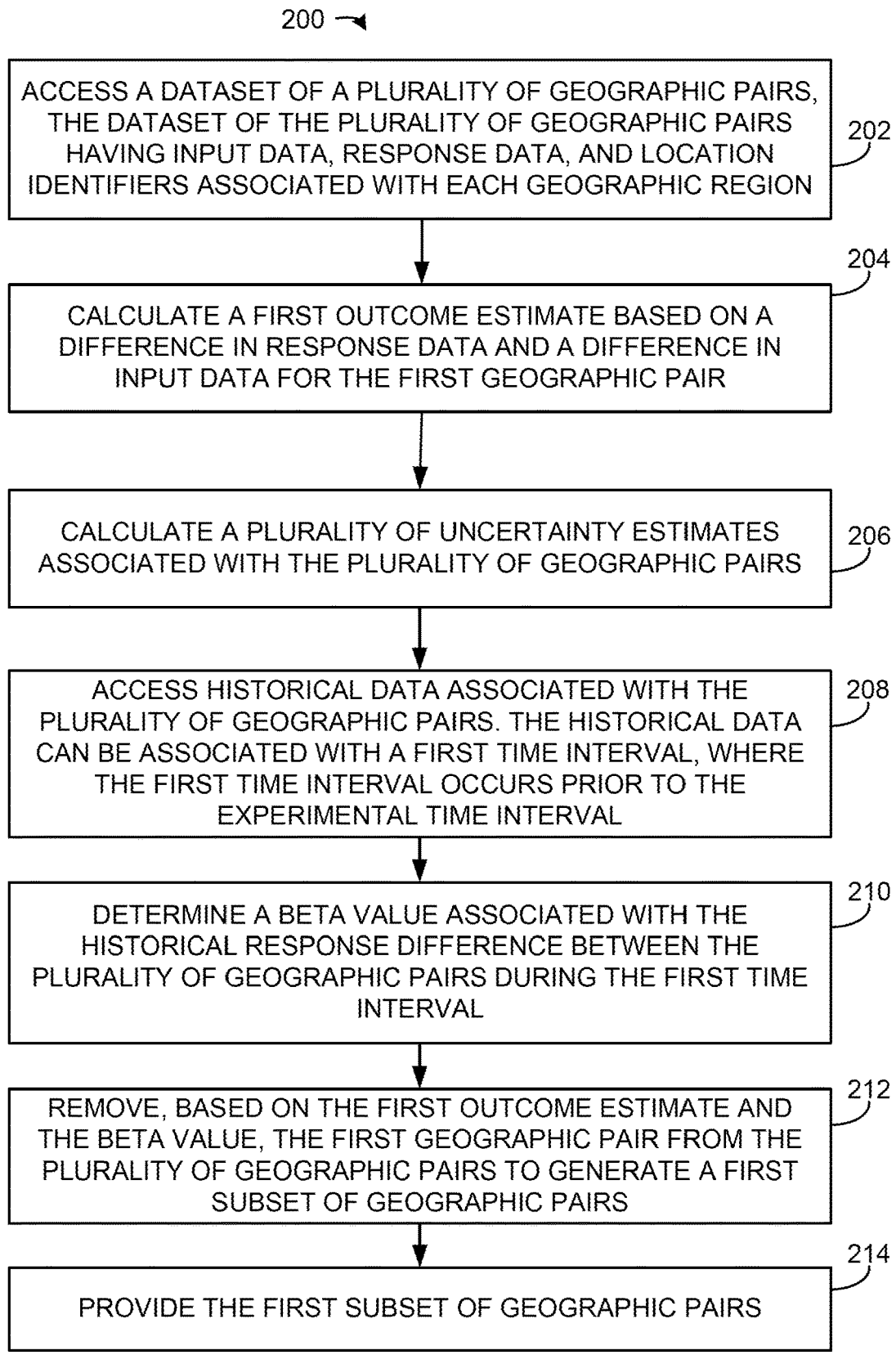
FIG. 2 depicts a flow chart diagram of an example method to perform according to example embodiments of the present disclosure.

FIG. 2 depicts a flow chart diagram of an example method to perform according to example embodiments of the present disclosure. Although FIG. 2 depicts steps performed in a particular order for purposes of illustration and discussion, the methods of the present disclosure are not limited to the particularly illustrated order or arrangement. The various steps of method 200 can be omitted, rearranged, combined, and/or adapted in various ways without deviating from the scope of the present disclosure.

At 202, a computing system (e.g., server computing system 130) can access a dataset of a plurality of geographic pairs. For example, the server computing system 130 can access the dataset of the plurality of geographic pairs from the analytics database 148, training data 162, and/or data 136, 156. The dataset of the plurality of geographic pairs can include input data, response data, and location identifiers associated with each geographic region for an experimental time interval and/or an historical time interval. The historical time interval can have occurred prior to the experimental time interval. Additionally, a first geographic pair of the dataset of the plurality of geographic pairs can include a first geographic region and a second geographic region.

In some instances, the dataset of the plurality of geographic pairs further includes difference in response data during the experimental time interval, difference in input data during the experimental time interval, and difference in input data during the first time interval.

In some instances, the response data can be a key performance indicator (KPI), such as the difference of sales (e.g., revenue) between the treatment geo and the control geo during a test period, which can be denoted as Y. Additionally, the input data can be the difference of expenses (e.g., ad spend) between the treatment and the control geos during the test period, which can be denoted as X.

In some instances, the response data can be a result of an action associated with the input data. access a dataset of a plurality of geographic pairs. For example, the response data can include incremental response on incremental input (iROCI) data. The input data can include resources provided by the content provider.

At 204, the computing system can calculate a first outcome estimate based on a difference in response data and a difference in input data for the first geographic pair. As described in FIG. 1B, the trimmed-match system 144 can perform a plurality of simulations (e.g., geo experiment simulations) to determine a plurality of outcome estimates. The plurality of outcome estimates can include the first outcome estimate for the first geographic pair.

In some instances, the plurality of different simulation for the plurality of geographic pairs are generated by separating the geographic region in a geographic pair of the plurality of geographic pairs into a treatment region or a control region for a plurality of simulations, where each simulation in the plurality of simulations generates an outcome estimate.

In some implementations, the first outcome estimate can be calculated for an experimental time interval. Method 200 can further include the computing system accessing training data associated with the plurality of geographic pairs, the training data being associated with a first time interval, the first time interval occurring prior to the experimental time interval. Additionally, the computing system can calculate a response difference total associated with the first time interval, the response difference total being a summation of a difference in input data and a difference in response data of the training data for each geographic pair in the plurality of geographic pairs. Moreover, the computing system can determine a beta value associated with the response difference total, the beta value being determined to reduce the sum of the plurality of uncertainty estimates associated with the plurality of geographic pairs. Furthermore, the first geographic pair can be removed from the plurality of geographic pairs at operation 212 further based on the beta value associated with the response difference total.

At 206, the computing system can calculate a plurality of uncertainty estimates associated with the plurality of geographic pairs. The plurality of uncertainty estimates can be calculated based on a plurality of different simulations for the plurality of geographic pairs. As described in FIG. 1B, the trimmed-match system 144 can calculate a plurality of uncertainty estimates based on each simulation in the plurality of simulated outcome estimates that is performed at operation 204.

In some instances, the plurality of uncertainty estimates is further calculated based on the outcome estimate for each simulation in the plurality of simulations.

At 208, the computing system can access historical data associated with the plurality of geographic pairs. The historical data can be associated with a first time interval, where the first time interval occurs prior to the experimental time interval. Additionally, the historical data can include of a historical response difference between the plurality of geographic pairs during the first time interval. For example, the historical response difference can be the difference of expenses (e.g., ad spend) between the treatment and the control goes before the test started, which can be denoted as V.

In some instances, the historical data can include historical input data and historical response data associated with each geographic region, and wherein the historical response difference is calculated based on a difference in historical response data and a difference in historical input data.

At 210, the computing system can determine a beta value associated with the historical response difference between the plurality of geographic pairs during the first time interval. The beta value can be determined (e.g., selected), by the machined-learned model 140, to reduce the sum of the plurality of experimental uncertainty estimates associated with the plurality of geographic pairs. For example, the beta value can be associated with the response difference for the first time interval.

In some instances, the response data can be a key performance indicator, and the beta value that is determined at operation 210 can be further based on the key performance indicator. For example, the key performance indicator can be the difference of sales (e.g., revenue) between the treatment geo and the control geo during a test period.

In some instances, the beta value can be further determined based on a confidence interval of a distribution curve associated with the plurality of uncertainty estimates being below a certain threshold. Alternatively, the confidence interval can be replaced with any other metric measuring estimation uncertainty. Example techniques for determining the beta value to minimize the confidence interval is described in the Determining a Beta Value and a Trim Rate to Minimize the Confidence Interval section above.

In some instances, the beta value can be determined based on any metric measuring estimation uncertainty, such as variance, range of expected outcome estimates, and so on.

In some instances, the system can determine, for any real value of beta value (ß), the point estimate and threshold (e.g., 50%) confidence interval of the predicted outcome (e.g., iROCI) by using the trimmed match technique, with input data (e.g., X and Y−ß*V) across all pairs. Moreover, the system, using a machined-learned model, can determine a beta value (ß) that provides a minimum threshold confidence interval (e.g., width of 50% confidence interval).

At 212, the computing system can remove, based on the first outcome estimate and the beta value, the first geographic pair from the plurality of geographic pairs to generate a first subset of geographic pairs. As described herein, the system can design geographic experimental datasets (e.g., geographic pairs) based on evaluating historical data to select well-matched geographic pairs utilized in a subsequent geographic experiment and also remove outlier pairs. The outlier pairs can be removed using the trimmed-match technique.

At 214, the computing system can provide the first subset of geographic pairs. In some implementations, the computing system can store, transmit, analyze, or perform another action with the first subset of geographic pairs.

In some instances, the system can use various metrics described herein and the first subset of geographic pairs to identify an opportune time to send a notification to the content provider device 126 to initiate a new content provider initiative.

In some instances, the system can use various metrics described herein and the first subset of geographic pairs to identify appropriate amounts (e.g., an optimal mixed media input) to input on various media channels (e.g., television advertising, Internet advertising, radio advertising.

Subsequently, the system can present, to a content provider device, a predicted outcome (e.g., an iROCI estimate) that is a small variance based on the determined beta (β) value. By using the beta value to adjust for an imbalance, the predicted outcome can be more accurate and have smaller variance (e.g., smaller range) than conventional methods.

In some implementations, method 200 can further include the system determining a trim rate. The trim rate is determined to reduce a sum of the plurality of uncertainty estimates associated with the plurality of geographic pairs. Example techniques for determining the trim rate to minimize the confidence interval is described in the Determining a Beta Value and a Trim Rate to Minimize the Confidence Interval section above. Additionally, the first geographic pair removed from the plurality of geographic pairs to generate the first subset of geographic pairs at operation 212 can be further based on the trim rate. Moreover, the trim rate can be further determined based on a confidence interval of a distribution curve associated with the plurality of uncertainty estimates being below a certain threshold.

In some implementations, the computing system can access data corresponding to a plurality of geographic regions, the data comprising input data, response data, and location identifiers associated with each geographic region. Additionally, the computing system can calculate a difference in input data and a difference in response data for each geographic region of the plurality of geographic regions. Moreover, the computing system can determine the plurality of geographic pairs based on the difference in response data and the difference in input data for each geographic region of the plurality of geographic regions.

In some implementations, the plurality of different simulation for the plurality of geographic pairs are generated by separating the geographic region in a geographic pair of the plurality of geographic pairs into a treatment region or a control region for a plurality of simulations, wherein each simulation in the plurality of simulations generates an outcome estimate. In some instances, the plurality of uncertainty estimates can be further calculated based on the outcome estimate for each simulation in the plurality of simulations.

In some implementations, method 200 can further include accessing data corresponding to a plurality of geographic regions. The data can include input data, response data, and location identifiers associated with each geographic region. Additionally, method 200 can further include calculating a difference in input data and a difference in response data for each geographic region of the plurality of geographic regions. Moreover, method 200 can further include determining the plurality of geographic pairs based on the difference in response data and the difference in input data for each geographic region of the plurality of geographic regions.

Figure 3:
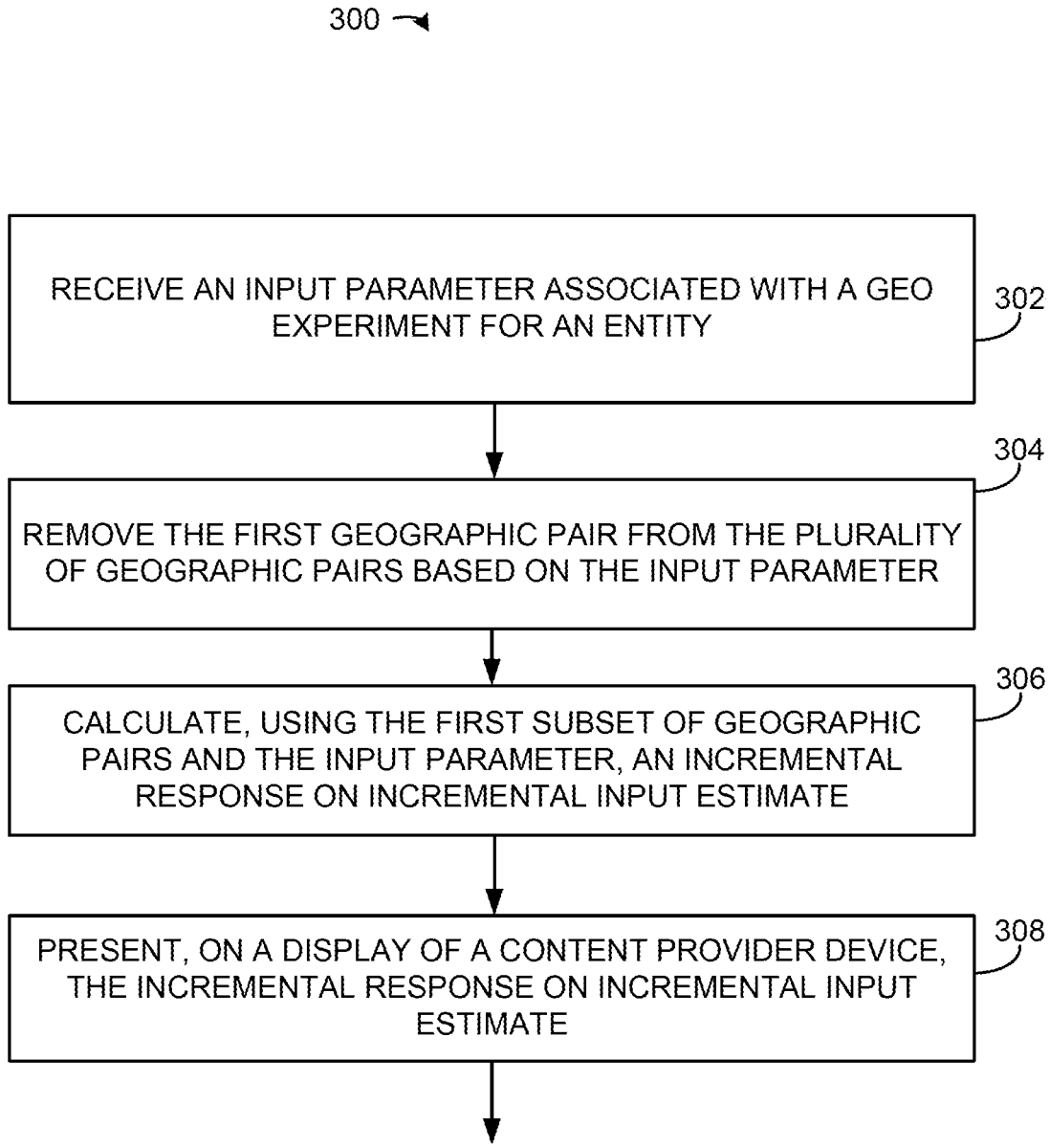
FIG. 3 depicts a flow chart diagram of an example method to perform according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

At 302, a computing system (e.g., server computing system 130) can receive an input parameter associated with a geo experiment for an entity. For example, the input parameter can include an experiment time interval, one or more geographic locations, and an input amount, content items, campaign identification, desired change in input level, or geographic areas to target.

In some instances, the input parameter can be the experimental time interval, and the beta value is further determined at operation 210 based on the experimental time interval.

In some instances, the input parameter can be a desired change in input level (e.g., change in ads spending budget), and the beta value is further at determined operation 210 based on the desired change in input level.

In some instances, the input parameter is a geographic area to target, and the beta value is further at determined operation 210 based on the geographic area to target.

In some instances, the input parameter is a campaign identification, and the beta value is further at determined operation 210 based on the campaign identification.

At 304, the computing system can remove the first geographic pair from the plurality of geographic pairs based on the input parameter. In some instances, operation 212 in method 200 can further include the computing system removing the first geographic pair from the plurality of geographic pairs based on the trim rate, the first outcome estimate, the beta value, and the input parameter.

At 306, the computing system can calculate, using the first subset of geographic pairs and the input parameter, an incremental response on incremental input estimate.

At 308, the computing system can present, on a display of a content provider device (e.g., computing provider device 126), the incremental response on incremental input estimate.

Figure 4:
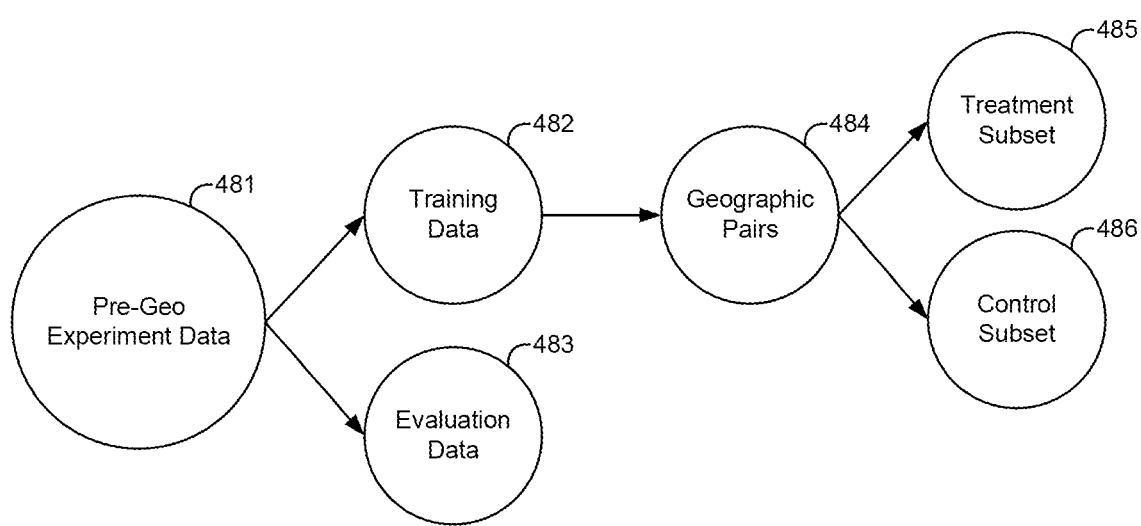
FIG. 4 is a block diagram illustrating pre-geo experiment data in connection with the system of FIG. 1, according to an illustrative implementation.

Referring now to FIG. 4, a block diagram illustrating pre-geo experiment data 481 in connection with the analysis system of FIGS. 1A-B as shown, according to an illustrative implementation. In some implementations, the pre-geo experiment data 481 can be extracted and utilized by the analytics system 142 of FIG. 1A (e.g., data preparation system 143 and modeler 146) to prepare data and design geo experiments. In some implementations, the pre-geo experiment data 481 can be split into two sets of data. As shown, the first set can be the training data 482 (e.g., training data 162 in FIG. 1A) and the second set can be the evaluation data 483. In some implementations, training data 482 can include response data and input data associated with a first time interval (also referred to herein as "a predefined period of time"). In various implementations, evaluation data 483 can include response data and input data associated with a second time interval (also referred to herein as "a different predefined period of time"). The response data can be a result of an action associated with the input data. That is, the response data may indicate particular amounts of revenue at particular times. In some embodiments, the response is the number of conversions, number of sales, number of account registrations, etc. at particular times. The input data may indicate particular amounts (e.g., fiat currency) of content input for the content type at particular times. The input data may further indicate a number of content runs at particular times.

In some implementations, the evaluation data 483 may be a subset of the training data 482 such that the second time interval is within the first time interval. For example, the evaluation data 483 may be response data and input data associated with May 2019, whereas the training data 482 may be response data and input data associated with the year 2019. Further, the response data and input data of the evaluation data 483 can be included in the response data and input data of the training data 482. That is, the training data 482 can include response data and input data from May 2019 but also includes all the other months of year 2019, whereas the evaluation data 483 may only include response data and input data from May 2019. In other implementations, the evaluation data 483 may be data that is different than in the training data 482 such that the second time interval is not within the first time interval. For example, the evaluation data 483 may be response data and input data associated with June 2025, whereas the training data 482 may be response data and input data associated with the years 2022-2024. Accordingly, the response data and input data of the evaluation data 483 would be different and not be included in the response data and input data of the training data 482.

In various implementations, each of the response data and input data for both the training data 482 and evaluation data 483 may be associated with a particular period of time. That is, the response data and input data may be categorized/grouped by a particular period of time (e.g., time interval). For example, the response data and input data may be grouped by months of a particular year. In another example, the response data and input data may be grouped by days of a particular month. In yet another example, the response data and input data may be grouped by minutes of a day. Both the training data 482 and evaluation data 483 are explained in further detail with reference to FIGS. 1-3.

In various implementations, the training data 482 can be utilized to generate geographic pairs 484. For example, the training data 482 may include data associated with 50 geographic regions, each geographic region including response data and input data about the specific geographic region. In this example, the 50 geographic regions could be paired into 25 geographic pairs. The pairing process is described in detail with reference to FIGS. 1-3. In some implementations, the geographic pairs 484 can be split into two subsets of data. As shown, the first set can be a treatment subset 485 and the second set can be a control subset 486. Both the treatment subset 485 and control subset 486 are explained in detail with reference to FIGS. 1-3. For example, with reference to the above example, each of the 25 geographic pairs may be split into a treatment region and a control region. The splitting of geographic pairs into treatment and control is described in detail with reference to FIGS. 1-3.

Figure 5:
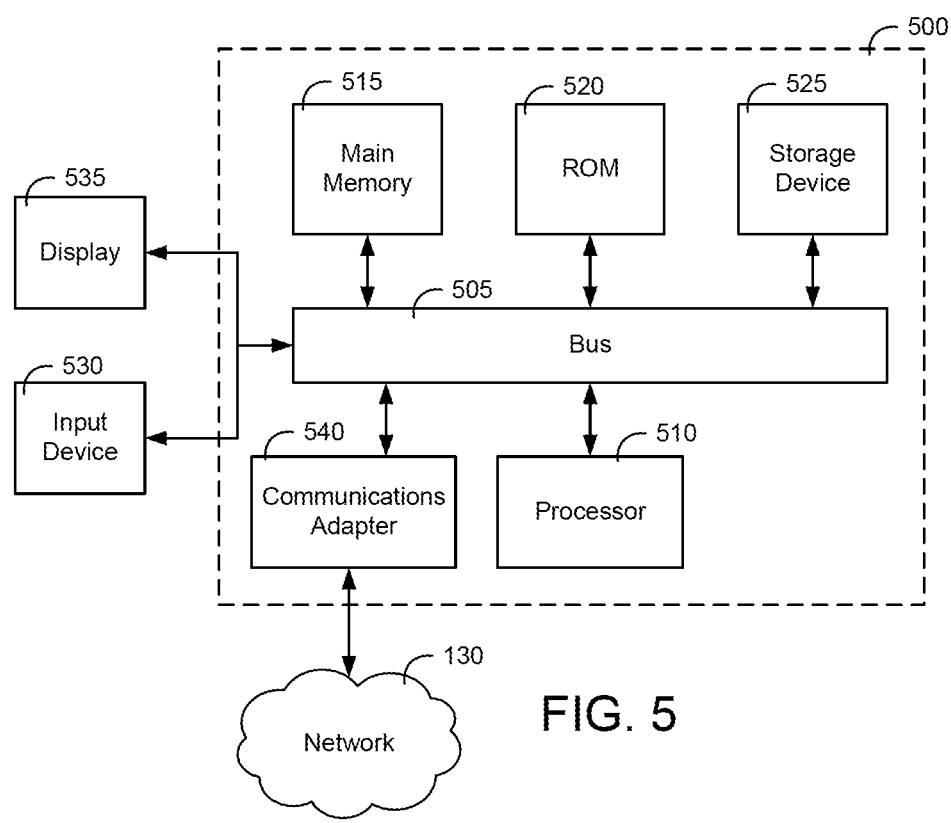
FIG. 5 is a block diagram of a computing system, according to an illustrative implementation.

FIG. 5 illustrates a depiction of a computer system 500 that can be used, for example, to implement a user computing device 102, a content provider device 126, an analytics system 142, a server computing system 130, a training computing system 150 and/or various other illustrative systems described in the present disclosure. The computing system 500 includes a bus 505 or other communication component for communicating information and a processor 510 coupled to the bus 505 for processing information. The computing system 500 also includes main memory 515, such as a random-access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid-state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information, and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

In some implementations, the computing system 500 may include a communications adapter 540, such as a networking adapter. Communications adapter 540 may be coupled to bus 505 and may be configured to enable communications with a computing or communications network 130 and/or other computing systems. In various illustrative implementations, any type of networking configuration may be achieved using communications adapter 540, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for preparing datasets for geo experiments, the method comprising:
    accessing, by the one or more computing devices, a dataset of a plurality of geographic pairs, the dataset of the plurality of geographic pairs comprising input data, response data, and location identifiers associated with each geographic region, wherein the response data is a result of an action associated with the input data, and wherein a first geographic pair of the dataset of the plurality of geographic pairs comprises a first geographic region and a second geographic region;
    calculating, by the one or more computing devices, a first outcome estimate based on a difference in response data and a difference in input data for the first geographic pair;
    calculating, by the one or more computing devices, a plurality of experimental uncertainty estimates associated with the plurality of geographic pairs during an experimental time interval, the plurality of experimental uncertainty estimates being calculated based on a plurality of different simulation for the plurality of geographic pairs during the experimental time interval;
    accessing, by the one or more computing devices, historical data associated with the plurality of geographic pairs, the historical data being associated with a first time interval, the first time interval occurring prior to the experimental time interval, and wherein the historical data comprises of a historical response difference between the plurality of geographic pairs during the first time interval;
    determining a beta value associated with the historical response difference between the plurality of geographic pairs during the first time interval, the beta value being determined to reduce a sum of the plurality of experimental uncertainty estimates of associated with the plurality of geographic pairs;
    removing, based on the first outcome estimate and the beta value, the first geographic pair from the plurality of geographic pairs to generate a first subset of geographic pairs; and
    providing, by the one or more computing devices, the first subset of geographic pairs.

2. The computer-implemented method of claim 1, further comprising:
    receiving an input parameter associated with a geo experiment for an entity;
    calculating, using the first subset of geographic pairs and the input parameter, an incremental response on incremental input estimate; and
    presenting, on a display of a content provider device, the incremental response on incremental input estimate.

3. The computer-implemented method of claim 2, wherein the first geographic pair is removed from the plurality of geographic pairs further based on the input parameter, the method further comprising:
    sending, based on the first subset of geographic pairs and the input parameter, a notification to the content provider device to initiate a content provider initiative.

4. The computer-implemented method of claim 2, wherein the input parameter is the experimental time interval, and wherein the beta value is determined based on the experimental time interval.

5. The computer-implemented method of claim 2, wherein the input parameter is a desired change in input level, and wherein the beta value is determined based on the desired change in input level.

6. The computer-implemented method of claim 2, wherein the input parameter is a geographic area to target, and wherein the beta value is determined based on geographic area to target.

7. The computer-implemented method of claim 1, wherein the beta value is further determined based on a confidence interval of a distribution curve associated with the plurality of experimental uncertainty estimates being below a certain threshold.

8. The computer-implemented method of claim 1, wherein the dataset of the plurality of geographic pairs further comprises difference in response data during the experimental time interval, difference in input data during the experimental time interval, and difference in input data during the first time interval.

9. The computer-implemented method of claim 1, wherein the historical data comprising historical input data and historical response data associated with each geographic, and wherein the historical response difference is calculated based on a difference in historical response data and a difference in historical input data.

10. The computer-implemented method of claim 1, further comprising:
    determining, by the one or more computing devices, a trim rate, the trim rate being determined to reduce a sum of the plurality of experimental uncertainty estimates associated with the plurality of geographic pairs; and
    wherein the first geographic pair is removed, based on the trim rate, from the plurality of geographic pairs to generate the first subset of geographic pairs.

11. The computer-implemented method of claim 10, wherein the trim rate is further determined based on a confidence interval of a distribution curve associated with the plurality of experimental uncertainty estimates being below a certain threshold.

12. The computer-implemented method of claim 1, further comprising:
accessing data corresponding to a plurality of geographic regions, the data comprising input data, response data, and location identifiers associated with each geographic region;
calculating a difference in input data and a difference in response data for each geographic region of the plurality of geographic regions; and
determining the plurality of geographic pairs based on the difference in response data and the difference in input data for each geographic region of the plurality of geographic regions.

13. The computer-implemented method of claim 1, wherein the plurality of different simulation for the plurality of geographic pairs are generated by separating the geographic region in a geographic pair of the plurality of geographic pairs into a treatment region or a control region for a plurality of simulations, wherein each simulation in the plurality of simulations generates an outcome estimate.

14. The computer-implemented method of claim 13, wherein the plurality of experimental uncertainty estimates is further calculated based on the outcome estimate for each simulation in the plurality of simulations.

15. The computer-implemented method of claim 1, wherein the response data is a key performance indicator, and the beta value is determined based on the key performance indicator.

16. A computing system, comprising:
one or more processors; and
one or more non-transitory computer-readable media that collectively store:
a machine-learned model, wherein the machine-learned model is configured to generate a first subset of geographic pairs from a plurality of geographic pairs; and
instructions that, when executed by the one or more processors, cause the computing system to perform operations, the operations comprising:
accessing a dataset of a plurality of geographic pairs, the dataset of the plurality of geographic pairs comprising input data, response data, and location identifiers associated with each geographic region, wherein the response data is a result of an action associated with the input data, and wherein a first geographic pair of the dataset of the plurality of geographic pairs comprises a first geographic region and a second geographic region;
calculating a first outcome estimate based on a difference in response data and a difference in input data for the first geographic pair;
calculating a plurality of experimental uncertainty estimates associated with the plurality of geographic pairs during an experimental time interval, the plurality of experimental uncertainty estimates being calculated based on a plurality of different simulation for the plurality of geographic pairs during the experimental time interval;
accessing historical data associated with the plurality of geographic pairs, the historical data being associated with a first time interval, the first time interval occurring prior to the experimental time interval, and wherein the historical data comprises of a historical response difference between the plurality of geographic pairs during the first time interval;
determining a beta value associated with the historical response difference between the plurality of geographic pairs during the first time interval, the beta value being determined to reduce a sum of the plurality of experimental uncertainty estimates of associated with the plurality of geographic pairs;
removing, based on the first outcome estimate and the beta value, the first geographic pair from the plurality of geographic pairs to generate the first subset of geographic pairs; and
providing the first subset of geographic pairs.

17. The computer system of claim 16, the operations further comprising:
receiving an input parameter associated with a geo experiment for an entity;
calculating, using the first subset of geographic pairs and the input parameter, an incremental response on incremental input estimate; and
presenting, on a display of a content provider device, the incremental response on incremental input estimate.

18. The computer system of claim 16, the operations further comprising:
determining, by the one or more computing devices, a trim rate, the trim rate being determined to reduce a sum of the plurality of experimental uncertainty estimates associated with the plurality of geographic pairs; and
wherein the first geographic pair is removed, based on the trim rate, from the plurality of geographic pairs to generate the first subset of geographic pairs.

19. The computer system of claim 16, the operations further comprising:
accessing data corresponding to a plurality of geographic regions, the data comprising input data, response data, and location identifiers associated with each geographic region;
calculating a difference in input data and a difference in response data for each geographic region of the plurality of geographic regions; and
determining the plurality of geographic pairs based on the difference in response data and the difference in input data for each geographic region of the plurality of geographic regions.

20. One or more non-transitory computer-readable media that collectively store instructions that, when executed by one or more processors, cause the one or more processors to perform operations comprising:
accessing a dataset of a plurality of geographic pairs, the dataset of the plurality of geographic pairs comprising input data, response data, and location identifiers associated with each geographic region, wherein the response data is a result of an action associated with the input data, and wherein a first geographic pair of the dataset of the plurality of geographic pairs comprises a first geographic region and a second geographic region;
calculating a first outcome estimate based on a difference in response data and a difference in input data for the first geographic pair;
calculating a plurality of experimental uncertainty estimates associated with the plurality of geographic pairs during an experimental time interval, the plurality of experimental uncertainty estimates being calculated based on a plurality of different simulation for the plurality of geographic pairs during the experimental time interval;
accessing historical data associated with the plurality of geographic pairs, the historical data being associated with a first time interval, the first time interval occurring prior to the experimental time interval, and wherein the historical data comprises of a historical response difference between the plurality of geographic pairs during the first time interval;

determining a beta value associated with the historical response difference between the plurality of geographic pairs during the first time interval, the beta value being determined to reduce a sum of the plurality of experimental uncertainty estimates of associated with the plurality of geographic pairs;

removing, based on the first outcome estimate and the beta value, the first geographic pair from the plurality of geographic pairs to generate a first subset of geographic pairs; and providing the first subset of geographic pairs.

* * * * *